March 10, 1931.    C. D. BOLIN    1,795,422

INDICATING DEVICE

Filed April 11, 1930

Inventor
CHAS. D. BOLIN
By E. E. Huffman
Att'y.

Patented Mar. 10, 1931

1,795,422

UNITED STATES PATENT OFFICE

CHARLES D. BOLIN, OF ST. LOUIS, MISSOURI

INDICATING DEVICE

Application filed April 11, 1930. Serial No. 443,268.

My invention relates to a temperature indicating device particularly suitable for use as an oven door thermometer, and among its objects are to avoid the use of the usual glass cover and the enclosed dial plate and pointer, and to provide mechanical temperature indicating means which will simulate the appearance and movement of the indicating column of a liquid thermometer. Other objects and advantages of my improved instrument will appear from the following description.

Figure 1:
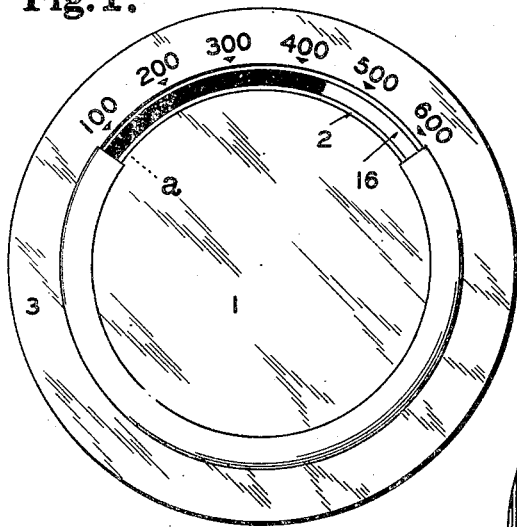
Figure 4:
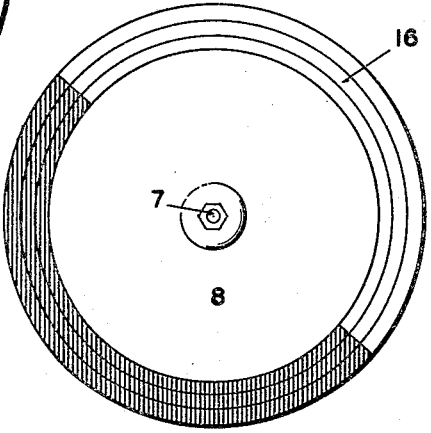
Figure 2:
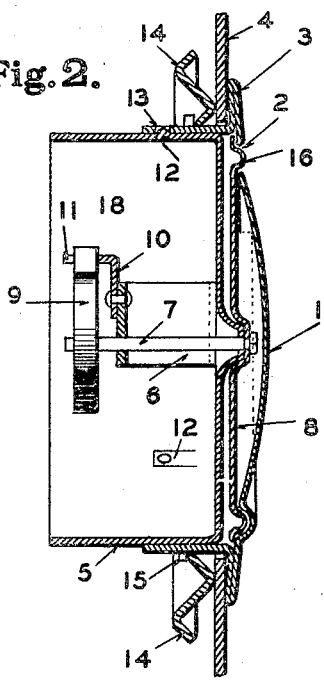
Figure 3:
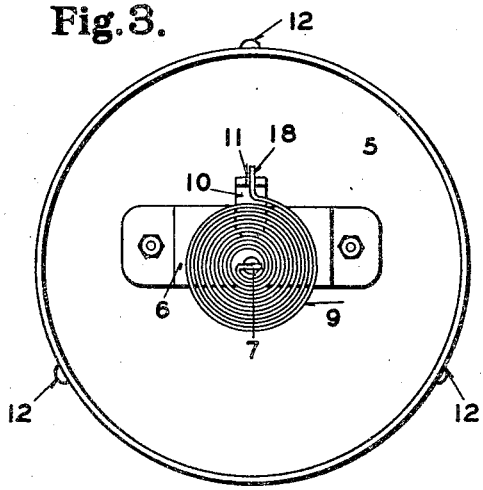

In the accompanying drawings Figure 1 is a front view of an indicating instrument embodying my invention; Figure 2 is a vertical central cross-sectional view; Figure 3 is a rear view of one element; and Figure 4 is a front elevational view of the indicator plate.

The instrument comprises a cup-shaped casing member 1 having a narrow extended arcuate opening 2 through its bottom (which forms the front of the instrument) and provided with an integral radially extending retaining flange 3 at its bottom for engagement with the outer surface of an oven wall (such as indicated at 4) in an opening through which the instrument is positioned. A second cup-shaped element 5 is fitted within the casing member, its bottom forming a closure separating the bottom (front) portion of the casing from the oven chamber. A bracket 6 is secured in the cup 5 and the indicator shaft 7 has a bearing in this bracket and in the bottom of the cup. On the end of the shaft, and outside the bottom of the cup and immediately behind the front wall of the casing, is mounted the indicator plate 8.

A spiral bi-metallic temperature responsive element 9 has one end secured to the end of the indicator shaft 7 and the other end 18 in sliding engagement with the fixed abutment 10 which is secured to the bracket 6 and provided with a slot 11 through which said latter end extends. Under increase in temperature the diameter of the temperature indicating spiral element 9 tends to increase and the sliding engagement of its end 18 with the abutment 10 permits uniform radial expansion and avoids any tendency of the spiral element to produce a restraining frictional pressure of the indicator shaft against its bearing in the bracket.

The cup 5 may be secured in desired relation to the casing 3 in any suitable manner, such as by spring lugs 12 engaging with holes 13 in the casing. A clamping ring 14 engaging lugs 15 of the casing and bearing on the inner surface of the oven or chamber wall 4 retains the instrument in position with the flange 3 of the casing in contact with the outer surface of the wall.

The indicator 8 is secured to the shaft 7 to be rotated thereby and, while it may be variously shaped, the circular disk form illustrated is desirable and convenient from the standpoint of manufacture and as a balanced element whose weight will have no influence upon the temperature-rotation curve of the indicator shaft. In the form shown the indicator disk is so dimensioned as to extend across the whole of the sight opening 2 in all of the rotative positions of the disk.

A portion of the periphery of the indicator plate having a path of rotation opposite the arcuate opening in the casing 1, is colored to contrast with the coloring of the outer surface of the casing adjacent the opening. This arcuate colored portion is of a length preferably greater than the length of the scale indications which may be marked on the casing adjacent the opening, and also preferably greater than the length of the opening, whereby the movement of the indicator from its lowest position toward the positions it assumes at higher temperatures, produces a simulation of a liquid column rising from below the lower end of the opening and scale. And this is true regardless of how wide a band of the indicator is colored, since the narrow arcuate opening in the otherwise opaque front of the instrument determines the width of the visible portion of the color band. In Figure 4 the colored band of the disk is lined to indicate red, which is a suitable color for the purpose. In Figure 1 the colored portion is shown as slightly narrower than the sight opening and with a portion visible corresponding to the condition existing at a temperature intermediate the limits for which the instrument is designed.

In order to improve the visibility of the indicating colored portion and the general appearance of the instrument, I prefer to strike-up an annular portion 16 of the indicator plate in order that it may project out substantially flush with the outer surface of the casing at the opening 2, the openings in the casing being made of the same radius as the said struck-up portion, and the casing bottom being provided with an annular recess in its rear surface, as shown, and forming a space to permit the annular portion 16 of the indicator plate to occupy and rotate in the position indicated.

While the portions of the indicator plate visible through the scale opening 2 in the instrument casing, may be colored or marked in any suitable manner to contrast with the portion functioning to produce the temperature indications, it is desirable that it have the same color as the color of the face of the casing adjacent the scale opening. Also, the indicator plate is preferably so positioned that at temperatures below those the thermometer is designed to indicate, a portion of the indicating color band is visible, its end being positioned, for example, about at the line "a" in Figure 1.

An instrument of my improved construction causes the temperature of the oven to be visible without effort and without conscious comparison of the indicator element with the scale indications, if any, or with the length of the arcuate opening.

In addition to the advantage of visually striking temperature indication, my improved thermometer has the further advantage that the exposed surface may be made to correspond in color to the surface of the oven wall or door in which it is mounted, and may be cleaned in the same manner and without any danger of injury.

Another advantage is that the visual indicating elements are not subject to external injury or to being obscured by moisture, dirt, or deposits from oven vapors, and that no additional member is required to form the scale element.

I am aware that modifications may be made in the indicator and in other features of the instrument described, without departing from my invention and I do not, therefore, intend that its scope be limited other than by the appended claims.

Having fully described my invention, what I claim as new and desire to secure by United States Letters Patent is:

1. In an indicating device, a scale member comprising means forming a narrow extended opening and scale indications adjacent said opening, and means forming a colored indicating surface movable across said opening along a path extending substantially in the direction of the length thereof, a portion of said indicating surface projecting into the plane of said opening when in indicating position.

2. An indicating device comprising a scale plate having a narrow extended opening therethrough and scale indications adjacent said opening, and means forming an extended indicating surface movable back of said opening along a path extending substantially in the direction of the length thereof, said indicating surface being marked to contrast with a portion of the scale plate adjacent said opening and its length being not less than the length of the scale.

3. In an indicating device, a scale element comprising means forming a narrow extended arcuate opening, and an indicator member mounted for movement behind said arcuate opening and of sufficient width to extend across substantially the whole of the said opening in one position, and extended part of that portion of the indicator member visible through said opening during the operative range of movement of the indicator member being marked to contrast with the scale element at said opening.

4. An indicating device comprising a scale plate having a narrow extended opening therethrough and scale indications adjacent said opening, and indicator member mounted for rotative movement behind said arcuate opening and embracing the whole of said opening in all of its operative positions, an extended continuous part of that portion of the indicator member visible through said opening during the operative range of movement of the indicator member being marked to contrast with the other visible portion of said member and with a portion of the scale plate adjacent the arcuate opening.

5. A temperature indicating device comprising a casing having an opaque front provided with a narrow extended arcuate opening, a rotatively movable indicator member in said casing, an arcuate portion of the surface of said member being colored and of substantially the same radius as said opening and having a path of movement aligned therewith, and temperature responsive means to actuate said indicator and cause varying proportions of said arcuate colored portion to be brought into view through said opening in accordance with variation in the temperature to which said temperature responsive means is subjected.

6. A temperature indicating device comprising a scale plate provided with a narrow extended arcuate opening and scale indications adjacent thereto, an indicator mounted for rotation back of said scale plate, said indicator being provided with an arcuate raised portion having a path of movement aligned with said opening and positioned closely adjacent to the edges thereof, said raised portion of the indicator being colored throughout a portion of its length at least equal to the length of the scale, to contrast with a color of the scale plate adjacent the arcuate opening, and temperature responsive means to rotate the indicator to advance more or less of the colored section thereof into view through the scale plate opening whereby the indicating column of a liquid thermometer is simulated.

7. An indicating device comprising a casing having an end provided with an arcuate sight opening therethrough, an indicator plate back of and mounted to rotate in a plane parallel to the end of the casing and having an arcuate ridged portion of the same radius as said sight opening and having a path of movement aligned therewith, a continuous section of said ridged portion of the indicator plate being colored to contrast with the colors of the indicator plate adjacent the opening, and temperature responsive means for rotating the indicator plate to bring more or less of said colored portion into view through said opening.

8. An indicating device comprising a front plate provided with an arcuate opening therethrough and with arcuate depressions in its rear surface of the same radius as said opening and extending from the ends thereof, an indicator plate back of and mounted to rotate in a plane parallel to said cover plate and having an arcuate ridged portion of the same radius and extending into the aforesaid depressions and across said arcuate opening, said ridged portion being of such length that a section thereof is opposite the whole of the opening in the cover plate in all operative positions of the indicator and a continuous section of said ridged portion of the indicator plate being colored to contrast with a color of the indicator plate adjacent the opening, and temperature responsive means for rotating the indicator plate to bring more or less of said colored portion into view through said opening.

9. An oven thermometer comprising a cup-shaped casing having a narrow extended arcuate opening through its bottom, an indicator plate mounted for rotative movement in a plane parallel to the bottom of said casing and extending opposite the whole of said arcuate opening in all of its operative positions, and means in the casing member and back of the indicator forming with the casing member a rear closure for the portion of the casing member in which the indicator is positioned.

10. An indicating device comprising a casing having a narrow extended opening through its bottom, and an indicator plate mounted for rotative movement in a plane parallel to the bottom of said casing and extending opposite the whole of said opening in all of its operative positions, said plate having a portion colored to contrast with other portions visible through the opening and so located as to present to view through the opening at all indicating positions of the indicator a continuous narrow band of color extending to one end of the opening.

11. A thermometer for mounting in an opening in the wall of a chamber, comprising a cup-shaped casing member to enter said opening and having an integral retainer flange at its bottom portion for engaging the outer surface of the wall of the chamber and a narrow arcuate opening through its bottom, a second cup-shaped member having a shaft mounted therein and extending through its bottom, said second cup fitting in the casing, an indicator plate mounted on said shaft outside and adjacent the bottom of said second cup and extending opposite the aforesaid arcuate opening in all of its operative positions, and temperature responsive means to rotate the shaft.

12. An oven thermometer comprising a cup-shaped casing member having a radially extending flange at its bottom portion and a narrow arcuate opening through its bottom, a second cup-shaped member having its bottom portion positioned within said casing member, a rotatable shaft extending through said bottom portion, a circular disk mounted on said shaft and extending opposite the whole of the opening in the casing member in all of its operative positions, and temperature responsive means for rotating said shaft and disk, an arcuate portion of the surface of the disk moving opposite the opening during the operative range of movement of the disk being colored to contrast with other visible portions of the disk and with the surface of a portion of the casing adjacent the arcuate opening.

13. In a temperature indicating device, means forming a narrow extended opening, temperature responsive means, and means forming a colored surface movable by said temperature responsive means opposite said opening along a path extending in the direction of the length thereof to render a narrow colored band visible through said opening whose length is proportional to the temperature effective on the temperature responsive means.

14. In an oven thermometer, means forming a narrow extended opening, temperature responsive means, and an indicator member actuated thereby and having an extended colored surface movable across said opening along a path extending in the direction of the length thereof, the indicator being so positioned that at atmospheric temperature a small portion of said colored surface is visible at one end of the opening.

In testimony whereof, I hereunto affix my signature, this 9th day of April, 1930.

CHARLES D. BOLIN.